(12) United States Patent
Wang et al.

(10) Patent No.: US 11,543,148 B2
(45) Date of Patent: Jan. 3, 2023

(54) AIR CONDITIONING SYSTEM AND CONTROL METHOD THEROF

(71) Applicant: Carrier Corporation, Palm Beach Gardens, FL (US)

(72) Inventors: Xiaohong Wang, Shanghai (CN); Hui Zhai, Shanghai (CN); Jian Ni, Shanghai (CN); Qing Lu, Shanghai (CN); Liang Chang, Shanghai (CN); Guangyu Shen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 298 days.

(21) Appl. No.: 16/842,255

(22) Filed: Apr. 7, 2020

(65) Prior Publication Data

US 2020/0318849 A1    Oct. 8, 2020

(30) Foreign Application Priority Data

Apr. 8, 2019 (CN) .......................... 201910275837.X

(51) Int. Cl.
*F24F 11/83* (2018.01)
*F24F 1/28* (2011.01)
*F24F 1/32* (2011.01)

(52) U.S. Cl.
CPC ................ *F24F 11/83* (2018.01); *F24F 1/28* (2013.01); *F24F 1/32* (2013.01)

(58) Field of Classification Search
CPC ...... F24F 3/065; F24F 1/28; F24F 1/32; F24F 11/30; F24F 11/83
See application file for complete search history.

(56) References Cited

U.S. PATENT DOCUMENTS

| 4,817,395 A | 4/1989 | Martinez, Jr. |
| 6,085,532 A | 7/2000 | Sibik |

(Continued)

FOREIGN PATENT DOCUMENTS

| CN | 201589376 U | 9/2010 |
| CN | 201589718 U | 9/2010 |

(Continued)

OTHER PUBLICATIONS

"Chilled-Water Systems Design Issues—Learning from Past Mistakes"; TRANE; Engineers Newsletter; vol. 43-2; 2014; 6 pages.

*Primary Examiner* — Lionel Nouketcha
(74) *Attorney, Agent, or Firm* — Cantor Colburn LLP

(57) ABSTRACT

An air conditioning system and a control method thereof. The air conditioning system includes: a plurality of indoor units connected in parallel; a plurality of outdoor units connected in parallel; and a coolant circulation circuit which circulates coolant through each of the indoor units connected in parallel and each of the outdoor units connected in parallel respectively, and which exchanges heat with each of the indoor units and each of the outdoor units; wherein the air conditioning system further includes a controller which, based on a number of actively operating indoor units, a total number of the indoor units and a total number of the outdoor units, defines an upper limit of a number of actively operating outdoor units, so that the flow rate of the coolant flowing through the actively operating outdoor units is not lower than a preset flow rate.

10 Claims, 1 Drawing Sheet

(56) References Cited

U.S. PATENT DOCUMENTS

| | | | |
|---|---|---|---|
| 6,732,540 B2 | 5/2004 | Sugihara et al. | |
| 7,600,389 B2 * | 10/2009 | Kim | F25B 13/00 |
| | | | 62/200 |
| 7,658,335 B2 | 2/2010 | Johnson | |
| 7,730,935 B1 | 6/2010 | Bujak, Jr. | |
| 8,126,595 B2 | 2/2012 | Milder et al. | |
| 8,275,483 B2 | 9/2012 | Higgins | |
| 8,285,129 B2 | 10/2012 | Kim et al. | |
| 8,939,196 B2 * | 1/2015 | Morita | F24F 3/065 |
| | | | 62/189 |
| 9,003,821 B2 | 4/2015 | Malone et al. | |
| 9,410,752 B2 | 8/2016 | Wallace | |
| 9,519,297 B1 | 12/2016 | Virskus | |
| 9,810,438 B2 | 11/2017 | Rothman et al. | |
| 9,845,983 B2 | 12/2017 | Tan | |
| 10,101,730 B2 | 10/2018 | Wenzel et al. | |
| 10,215,427 B2 * | 2/2019 | Lu | F24F 5/0003 |
| 2009/0178424 A1 * | 7/2009 | Hwang | F24F 1/40 |
| | | | 62/157 |
| 2014/0223941 A1 * | 8/2014 | Nishimura | F24F 11/89 |
| | | | 62/190 |
| 2017/0212488 A1 | 7/2017 | Kummer et al. | |
| 2017/0234559 A1 | 8/2017 | Federspiel et al. | |
| 2018/0239371 A1 | 8/2018 | Drees et al. | |
| 2018/0284701 A1 | 10/2018 | Salsbury et al. | |

FOREIGN PATENT DOCUMENTS

| | | |
|---|---|---|
| CN | 102288421 A | 12/2011 |
| CN | 103383121 A | 11/2013 |
| CN | 105864016 A | 8/2016 |
| EP | 2313694 B1 | 4/2016 |
| EP | 2775221 B1 | 9/2018 |
| WO | 2018011761 A1 | 1/2018 |
| WO | 2018087810 A1 | 2/2019 |

* cited by examiner

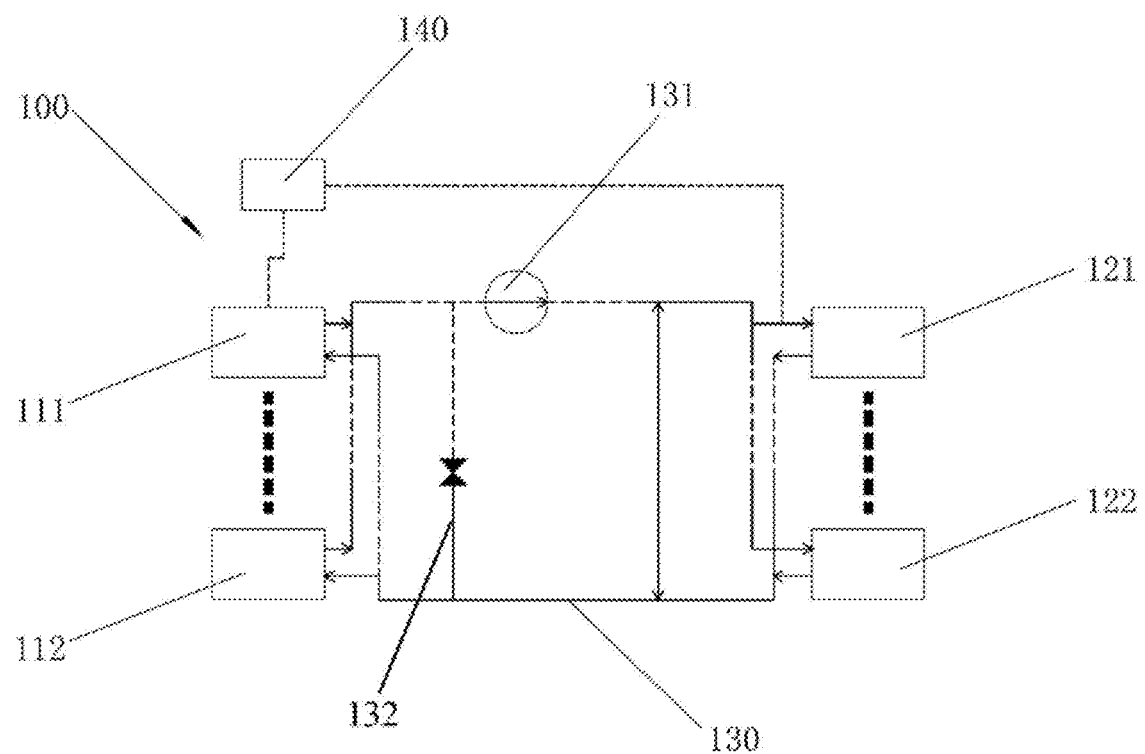

AIR CONDITIONING SYSTEM AND CONTROL METHOD THEROF

FOREIGN PRIORITY

This application claims priority to Chinese Patent Application No. 201910275837.X, filed Apr. 8, 2019, and all the benefits accruing therefrom under 35 U.S.C. § 119, the contents of which in its entirety are herein incorporated by reference.

FIELD OF THE INVENTION

The present disclosure relates to the field of air conditioning, and in particular to an air conditioning system and a control method thereof.

BACKGROUND OF THE INVENTION

Currently, in large-scale scenarios with refrigeration requirements in commercial applications, a coolant (e.g., water) circulation circuit is usually disposed between indoor units and outdoor units to transfer cold or heat. A refrigerant circuit is also usually disposed in each outdoor units, and the refrigerant therein exchanges heat with the coolant circulation circuit through a heat exchanger (for example, a welded plate heat exchanger) in the refrigerant circuit. In this case, in order to prevent the heat exchanger from freezing due to insufficient heat absorption, a threshold value should be set for the flow rate of the coolant in the coolant circulation circuit flowing through each outdoor units. When the flow rate is below the threshold value, an alarm is triggered. However, in practical applications, for example, when a total load of the indoor units is low due to the small number of operating indoor units, if a large load is still maintained on the outdoor unit and the adjustment capability of a bypass flow path is insufficient, the aforementioned alarm will also be triggered. Because such phenomena are common, alarm will be triggered frequently, or even the system will be shut down, which greatly affects the reliability of system operation and user experience.

SUMMARY OF THE INVENTION

In view of this, an air conditioning system and a control method thereof are provided by the present disclosure, thereby effectively solving or at least alleviating one or more of the above problems in the prior art and in other aspects.

In order to achieve at least one object of the present disclosure, an air conditioning system is provided according to an aspect of the present disclosure, which includes: a plurality of indoor units connected in parallel; a plurality of outdoor units connected in parallel; and a coolant circulation circuit which circulates coolant through each of the indoor units connected in parallel and each of the outdoor units connected in parallel respectively, and which exchanges heat with each of the indoor units and each of the outdoor units; wherein the air conditioning system further includes a controller which, based on a number of actively operating indoor units, a total number of the indoor units and a total number of the outdoor units, defines an upper limit of a number of actively operating outdoor units, so that the flow rate of the coolant flowing through the actively operating outdoor units is not lower than a preset flow rate.

Optionally, the upper limit of the number of the actively operating outdoor units is $N_{limit}=K*(M_{running}/Mt_{total})*_{total}$; where K is a set coefficient, $M_{running}$ is the number of actively operating indoor units, $M_{total}$ is the total number of the indoor units, and $N_{total}$ is the total number of the outdoor units.

Optionally, when the obtained $N_{limit} \leq 1$, the $N_{limit}$ is determined to be 1; and when the obtained $N_{limit} > 1$, the $N_{limit}$ is rounded down.

Optionally, $K \leq 1$ or $K > 1$.

Optionally, $K=2.5$.

Optionally, the preset flow rate is not lower than 70% of a rated flow rate of the outdoor units.

Optionally, the air conditioning system further includes a temperature sensor disposed downstream of the indoor units in the coolant circulation circuit to sense a temperature of returned water; wherein the controller is further configured to, when the temperature of returned water is higher than a preset temperature, increase the number of actively operating outdoor units within the upper limit of the number of actively operating outdoor units, and/or increase the operating frequency of the actively operating outdoor units.

In order to achieve at least one object of the present disclosure, a control method of an air conditioning system is further provided according to another aspect of the present disclosure, wherein the air conditioning system includes: a plurality of indoor units connected in parallel; a plurality of outdoor units connected in parallel; a coolant circulation circuit which circulates coolant through each of the indoor units connected in parallel and each of the outdoor units connected in parallel respectively, and which exchanges heat with each of the indoor units and each of the outdoor units; and a controller; the control method includes: based on a number of actively operating indoor units, a total number of the indoor units and a total number of the outdoor units, defining an upper limit of actively operating outdoor units, so that the flow rate of the coolant flowing through the actively operating outdoor units is not lower than a preset flow rate.

Optionally, the upper limit of the number of the actively operating outdoor units is $N_{limit}=K*(M_{running}/M_{total})*N_{total}$; where K is a set coefficient, $M_{running}$ is the activation number of actively operating indoor units, $M_{total}$ is the total number of the indoor units, and $N_{total}$ is the total number of the outdoor units.

Optionally, when the obtained $N_{limit} \leq 1$, the $N_{limit}$ is determined to be 1; and when the obtained $N_{limit} > 1$, the $N_{limit}$ is rounded down.

Optionally, $K \leq 1$ or $K > 1$.

Optionally, $K=2.5$.

Optionally, the preset flow rate is not lower than 70% of a rated flow rate of the outdoor units.

Optionally, a temperature of returned water after the coolant in the coolant circulation circuit flows out of the indoor units is obtained; When the temperature of returned water is higher than a preset temperature, the number of actively operating outdoor units is increased within the upper limit of the number of actively operating outdoor units, and/or the operating frequency of the actively operating outdoor units is increased.

According to the air conditioning system and the control method thereof a the present disclosure, by associating the operating state of the indoor units with the adjustment of the outdoor units, the system is capable of defining an upper limit of the number of actively operating outdoor units based on a number of actively operating indoor units, a total number of the indoor units and a total number of the outdoor units, so that the flow rate of the coolant flowing through the actively operating outdoor units is not lower than a preset flow rate. In this way, it is ensured that the outdoor units will not be frozen due to overly low flow rate even if the indoor units have a low load, and triggering of freezing alarm is also avoided.

BRIEF DESCRIPTION OF THE DRAWINGS

The technical solutions of the present disclosure will be further described in detail below with reference to the accompanying drawings and embodiments, but it should be understood that the drawings are only provided for the purpose of explanation, and should not be considered as limiting the scope of the present disclosure. In addition, unless otherwise specified, the drawings are only intended to conceptually illustrate the structures and constructions described herein, and are not necessarily drawn to scale.

FIG. 1 is a schematic diagram of an embodiment of an air conditioning system of the present disclosure.

DETAILED DESCRIPTION OF THE EMBODIMENT(S) OF THE INVENTION

The present disclosure will be described more fully with reference to the accompanying drawings in which exemplary embodiments of the present disclosure are illustrated. However, it should be understood that the present disclosure may be embodied in a variety of different forms and should not be construed as being limited to the embodiments set forth herein. Herein, the embodiments are provided to make the present disclosure more complete and thorough, and to fully convey the concept of the present disclosure to those skilled in the art.

It should also be understood by those skilled in the art that the air conditioning system proposed by the present disclosure does not narrowly refer to an air conditioner for use in a building having an outdoor cooling/heating unit and an indoor heat exchange unit in the industry. It should be construed as a kind of thermal system with air conditioning function, which is driven by various types of power sources (for example, electric power) to transfer the heat generated by phase change of the refrigerant in the system to a position to be adjusted via the coolant, and to exchange heat with the air there.

Referring to FIG. 1, an embodiment of an air conditioning system 100 is illustrated. The air conditioning system 100 includes a plurality of indoor units 111, 112, a plurality of outdoor units 121, 122, and a coolant circulation circuit 130. The coolant circulation circuit 130 has branches connected in parallel with each other which lead to individual indoor units 111, 112 so that each branch exchanges heat with the corresponding indoor units 111, 112 or is separately controlled. Similarly, the coolant circulation circuit 130 also has branches connected in parallel with each other which lead to the corresponding outdoor units 121, 122 so that each branch exchanges heat with the corresponding outdoor units 121, 122 or is separately controlled. In such an arrangement, each of the outdoor units 121, 122 typically includes an independent refrigeration circuit such that the compressed refrigerant in the refrigeration circuit transfers cold or heat between the outdoor environment and the coolant in the coolant circuit 130. The coolant circuit transfers the cold or heat from the outdoor units 121, 122 to the actively operating indoor units 111, 112 via the coolant. In this case, the indoor units 111 and 112 may have only a fan and an air outlet structure, thereby directly driving the air and the coolant circulation circuit 130 passing through the indoor units 111 and 112 to exchange heat via convection to realize the air conditioning function; alternatively, the indoor units 111, 112 may also have another refrigeration circuit, that is, the air conditioning function is realized by heat exchange between the coolant in the coolant circulation circuit 130 and the application environment via the refrigerant in the refrigeration circuit again. Generally, in order to achieve control of the flow of the coolant in the coolant circulation circuit 130, a hydraulic module 131 is also provided, which typically includes a drive pump and a regulating valve to respectively realize the functions of power supplying and flow control.

In addition, the air conditioning system 100 further includes a controller 140 which, based on a number of actively operating indoor units 111, 112, a total number of the indoor units 111, 112 and a total number of the outdoor units 121, 122, defines an upper limit of a number of actively operating outdoor units 121, 122, so that the flow rate of the coolant flowing through the actively operating outdoor units 121, 122 is not lower than a preset flow rate. In this case, by associating the operating state of the indoor units 111, 112 with the adjustment of the outdoor units 121, 122, it is ensured that the outdoor units 121, 122 will not be frozen due to overly low flow rate even if the indoor units 111, 112 have a low load, and triggering of freezing alarm is also avoided.

In order to achieve the above control, as a specific manner of determining, the upper limit of the number of actively operating outdoor units 121, 122 may be $N_{limit}=K*(M_{running}M_{total})*N_{total}$; where K is a set coefficient, $M_{running}$ is the number of actively operating indoor units 111, 112, $M_{total}$ is the total number of the indoor units 111, 112, and $N_{total}$ is the total number the outdoor units 121, 122. In this case, if the number of actively operating indoor units 111, 112 has a reduced percentage in the total number of the indoor units 111, 112, it means that the flow rate of the coolant in the coolant circulation circuit 130 that is required to participate in work is also reduced accordingly; that is, the flow rate of the coolant flowing through each of the outdoor units 121, 122 is also reduced. In this situation, in order to prevent the components in the outdoor units 121 and 122 from being frozen due to the flow rate of the coolant flowing through the outdoor units 121 and 122 being lower than a preset flow rate, the number of actively operating outdoor units 121 and 122 should be reduced. According to the above manner of determining, the number is the upper limit of the number of operable outdoor units 121 and 122. When the number of actively operating outdoor units 121 and 122 is not less than the upper limit, the flow rate of the coolant flowing through the outdoor units 121 and 122 will be higher than the preset flow rate, which avoids the freezing problem and improves system reliability. Also, as can be known from the above manner of determining, the upper limit of the number is also associated with the set coefficient K, which is an operating margin provided by the work staff. For example, K>1 can be set, for the purpose of improving reliability as much as possible, and K≤1 can be set, for the purpose of energy saving. In any case, it should be ensured that the setting of K does not cause the following situation within the upper limit $N_{limit}$ of the number of actively operating outdoor units 121, 122: the flow rate of the coolant flowing through the outdoor units 121, 122 being lower than the preset flow rate. Therefore, K>1 is typically set. In a more reliable solution, K=2.5 is set.

Similarly, the preset flow rate mentioned in the foregoing embodiment may be associated with various design parameters of the outdoor units 121, 122, and the preset flow rate may be adjusted according to the degree to which the freezing problem at a lower flow rate can be tolerated. For example, in a more reliable solution, the preset flow rate can be set to be no less than 70% of the rated flow rate of the outdoor units 121, 122.

In addition, when the above manner of determining is used in actual applications to obtain the upper limit $N_{limit}$ of the number of actively operating outdoor units 121 and 122, there may be a case where the upper limit of the number of actively operating outdoor units 121 and 122 is not an integer. However, the number of operable outdoors units in actual operation is necessarily an integer. In this case, when the obtained upper limit of the number actively operating outdoor units, $N_{limit} \leq 1$, in order to ensure that the system can work normally, $N_{limit}$ can be determined to be 1. When the obtained $N_{limit} > 1$, the $N_{limit}$ may be rounded down to ensure that the flow requirements of the actively operating outdoor units 121 and 122 are met. For example, when $N_{limit} = 5.4$, the upper limit of the number of actively operating outdoor units 121 and 122 is 5.

Furthermore, if it is desired to further improve the adjustment capability of the coolant circulation circuit 130 of the system, a bypass branch 132 may be added in the circuit to provide a certain degree of bypass flow to meet the minimum flow requirements of the outdoor units 121, 122. Specifically, on one hand, it is necessary to ensure that a coolant having a sufficient flow rate flows through the outdoor units 121, 122 to prevent it from freezing; and on the other hand, the cooling capacity or heating capacity required by the indoor units 111, 112 is limited, and accordingly the flow rate of the coolant required to flow therethrough is also limited. In this case, if a difference between the coolant flow rate required by the outdoor units and the coolant flow rate required by the indoor units is within an adjustable range of the bypass branch 132, the bypass branch 132 is opened to bypass this part of coolant, so that the low load demand of the indoor units and the anti-freezing demand of the outdoor units are both met.

Optionally, a temperature sensor may also be provided within the system. The temperature sensor is disposed downstream of the indoor units 111, 112 in the coolant circulation circuit 130 to sense the temperature of returned water. In this case, the controller 140 is further configured to, when the temperature of returned water is higher than a preset temperature, increase the number of actively operating outdoor units 121, 122 within the upper limit of the number of actively operating outdoor units 121, 122, and/or increase the operating frequency of the actively operating outdoor units 121, 122. At this point, on one hand, the output capacity of the outdoor units 121, 122 can be adjusted according to the temperature of returned water, so that the cooling capacity or the heating capacity required by the indoor units 111, 112 can be met; and on the other hand, each of the above adjustments is within the upper limit of the number of actively operating outdoor units 121, 122, whereby it is ensured that the adjustment process does not affect the minimum output flow rate of the outdoor units 121, 122, thereby avoiding triggering an alarm or occurrence of freezing phenomenon, and improving system reliability.

Further, although not shown in the drawings, a control method of an air conditioning system is also provided herein. The control method can be applied to the air conditioning system described in any of the foregoing embodiments or combinations thereof. Alternatively, it can be applied to other air conditioning systems as well. In this case, the air conditioning system to which the control method is applied should include: a plurality of indoor units connected in parallel; a plurality of outdoor units connected in parallel; and a coolant circulation circuit. The coolant circulation circuit circulates coolant through each of the indoor units connected in parallel and each of the outdoor units connected in parallel respectively, and exchanges heat with each of the indoor units and each of the outdoor units. In addition, the air conditioning system should further include a controller. In the application process, the control method includes: based on number of actively operating indoor units, a total number of the indoor units and a total number of the outdoor units, defining an upper limit of an number of actively operating outdoor units, so that the flow rate of the coolant flowing through the actively operating outdoor units is not lower than a preset flow rate. Under the control of the control method, by associating the operating state of the indoor units with the adjustment of the outdoor units, it is ensured that the outdoor units will not be frozen due to overly low flow rate even if the indoor units have a low load, and triggering of freezing alarm is also avoided.

In order to achieve the above control, as a specific manner of determining in the control method, the upper limit of the number of actively operating outdoor units may be $N_{limit} = K^*(M_{running}/M_{total})^*N_{total}$; where K is a set coefficient, $M_{running}$ is the number of actively operating indoor units, $M_{total}$ is the total number of the indoor units, and $N_{total}$ is the total number of the outdoor units. In this case, if the number of actively operating indoor units has a reduced percentage in the total number of the indoor units, it means that the flow rate of the coolant in the coolant circulation circuit that is required to participate in work is also reduced accordingly; that is, the flow rate of the coolant flowing through each of the outdoor units is also reduced. In this situation, in order to prevent the components in the outdoor units from being frozen due to the flow rate of the coolant flowing through the outdoor units being lower than a preset flow rate, the number of actively operating outdoor units should be reduced. According to the above manner of determining, the number is the upper limit of the number of operable outdoor units. When the number of actually actively operating outdoor units is not less than the upper limit, the flow rate of the coolant flowing through the outdoor units will be higher than the preset flow rate, which avoids the freezing problem and improves system reliability. Also, as can be known from the above manner of determining, the upper limit of the number is also associated with the set coefficient K, which is an operating margin provided by the work staff. For example, $K > 1$ can be set, for the purpose of improving reliability as much as possible, and $K \leq 1$ can be set, for the purpose of energy saving. In any case, it should be ensured that the setting of K does not cause the following situation within the upper limit $N_{limit}$ of the number of actively operating outdoor units: the flow rate of the coolant flowing through the outdoor units being lower than the preset flow rate. Therefore, $K > 1$ is typically set. In a more reliable solution, $K = 2.5$ is set.

Similarly, the preset flow rate mentioned in the foregoing embodiment may be associated with various design parameters of the outdoor units, and the preset flow rate may be adjusted according to the degree to which the freezing problem at a lower flow rate can be tolerated. For example, in a more reliable solution, the preset flow rate can be set to be no less than 70% of the rated flow rate of the outdoor units.

In addition, when the above manner of determining is used in actual applications to obtain the upper limit $N_{limit}$ of the number of actively operating outdoor units, there may be a case where the upper limit of the number of actively operating outdoor units is not an integer. However, the number of operable outdoor units actively operating is necessarily an integer. In this case, when the obtained upper limit of the number of actively operating outdoor units, $N_{limit} \leq 1$, in order to ensure that the system can work normally, $N_{limit}$ can be determined to be 1. When the obtained $N_{limit} > 1$, the $N_{limit}$ may be rounded down to ensure that the flow requirements of the actively operating outdoor units are met. For example, when $N_{limit}=5.4$, the upper limit of the number of actively operating outdoor units is 5.

Furthermore, if it is desired to further improve the adjustment capability of the coolant circulation circuit of the system, a bypass branch may be added in the circuit to provide a certain degree of bypass flow to meet the minimum flow requirements of the outdoor units.

Optionally, a temperature sensor may also be provided within the system to sense a temperature of returned water after the coolant in the coolant circulation circuit flows out of the indoor units. In this case, the controller is further configured to adjust the outdoor units based on the temperature of returned water. Specifically, the controller is configured to: When the temperature of returned water is higher than a preset temperature, increase the number of actively operating outdoor units within the upper limit of the number of actively operating outdoor units, and/or increase the operating frequency of the actively operating outdoor units. At this point, on one hand, the output capacity of the outdoor units can be adjusted according to the temperature of returned water, so that the cooling capacity or the heating capacity required by the indoor units can be met; and on the other hand, each of the above adjustments is within the upper limit of the number of actively operating outdoor units, whereby it is ensured that the adjustment process does not affect the minimum output flow rate of the outdoor units, thereby avoiding triggering an alarm or occurrence of freezing phenomenon; and improving system reliability.

In addition, it should be noted that while particular order of steps may have been shown, disclosed, and claimed in the above particular embodiments, it is understood that some steps can be carried out, separated or combined in any order unless it is expressly indicated that they should be executed in the particular order.

The controllers described above for performing the aforementioned method may involve several functional entities that do not necessarily have to correspond to physically or logically independent entities. These functional entities may also be implemented in software, or implemented in one or more hardware modules or integrated circuits, or implemented in different processing devices and/or microcontroller devices.

In the description, examples are used to disclose the present application, including the best mode, with the purpose of enabling any person skilled in the art to practice the application, including making and using any device or system and performing any of the methods covered. The scope of protection of the present application is defined by the claims, and may include other examples that can be conceived by those skilled in the art. If such other examples have structural elements that do not differ from the literal language of the claims, or if they include equivalent structural elements that do not substantively differ from the literal language of the claims, these examples are also intended to be included in the scope of the claims.

What is claimed is:

1. An air conditioning system, characterized in comprising:
   a plurality of indoor units connected in parallel;
   a plurality of outdoor units connected in parallel; and
   a coolant circulation circuit which circulates a coolant through each of the indoor units connected in parallel and each of the outdoor units connected in parallel respectively, and which exchanges heat with each of the indoor units and each of the outdoor units;
   wherein the air conditioning system further comprises a controller which, based on a number of actively operating indoor units, a total number of the indoor units and a total number of the outdoor units, defines an upper limit of a number of actively operating outdoor units, so that a flow rate of the coolant flowing through actively operating outdoor units is not lower than a preset flow rate.

2. The air conditioning system according to claim 1, wherein the upper limit of the number of actively operating outdoor units is Nlimit=K*(Mrunning/Mtotal)*Ntotal; where K is a predetermined coefficient, Mrunning is the number of actively operating indoor units, Mtotal is the total number of the indoor units, and Ntotal is the total number of the outdoor units.

3. The air conditioning system according to claim 2, wherein when Nlimit≤1, Nlimit is set to 1; and when the obtained Nlimit>1, Nlimit is rounded down to a nearest integer.

4. The air conditioning system according to claim 2, wherein K=2.5.

5. The air conditioning system according to claim 1, further comprising a temperature sensor disposed downstream of the indoor units in the coolant circulation circuit to sense a temperature of returned water; wherein the controller is further configured to, when the temperature of returned water is higher than a preset temperature, increase the number of actively operating outdoor units within the upper limit of the number of actively operating outdoor units, and/or increase the operating frequency of the actively operating outdoor units.

6. A control method of an air conditioning system, wherein the air conditioning system comprises:
   a plurality of indoor units connected in parallel;
   a plurality of outdoor units connected in parallel;
   a coolant circulation circuit which circulates a coolant through each of the indoor units connected in parallel and each of the outdoor units connected in parallel respectively, and which exchanges heat with each of the indoor units and each of the outdoor units; and
   a controller;
   the control method comprises: based on a number of actively operating indoor units, a total number of the indoor units and a total number of the outdoor units, defining an upper limit of a number of actively operating outdoor units, so that a flow rate of the coolant flowing through actively operating outdoor units is not lower than a preset flow rate.

7. The control method according to claim 6, wherein the upper limit of the number of actively operating outdoor units is Nlimit=K*(Mrunning/Mtotal)*Ntotal; where K is a predetermined set coefficient, Mrunning is the number of actively operating indoor units, Mtotal is the total number of the indoor units, and Ntotal is the total number of the outdoor units.

8. The control method according to claim 7, wherein when Nlimit≤1, Nlimit is set to 1; and when Nlimit>1, Nlimit is rounded down to a nearest integer.

9. The control method according to claim 7, wherein K=2.5.

10. The control method according to claim 6, wherein a temperature of returned water after the coolant in the coolant circulation circuit flows out of the indoor units is obtained; when the temperature of returned water is higher than a preset temperature, the number of actively operating outdoor units is increased within the upper limit of the number of actively operating outdoor units, and/or the operating frequency of the actively operating outdoor units is increased.

\* \* \* \* \*